(12) United States Patent
Dimitruk et al.

(10) Patent No.: US 8,095,404 B2
(45) Date of Patent: *Jan. 10, 2012

(54) DECISION MAKING AND IMPLEMENTATION SYSTEM

(75) Inventors: Paul Arthur Dimitruk, Santa Monica, CA (US); Mark Allen Auburn, Manhattan Beach, CA (US); Mark Kevin Long, Santa Monica, CA (US); Christian Alexander Maas, Santa Monica, CA (US); Jane MacIntyre Kirkland, Sewickley, PA (US)

(73) Assignee: Concerro, Inc., San Diego, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 12/123,388

(22) Filed: May 19, 2008

(65) Prior Publication Data

US 2008/0235219 A1    Sep. 25, 2008

Related U.S. Application Data

(63) Continuation of application No. 09/811,311, filed on Mar. 16, 2001, now Pat. No. 7,376,576.

(51) Int. Cl.
*G06F 17/60* (2006.01)

(52) U.S. Cl. .................................... 705/7.11
(58) Field of Classification Search .............. 705/7, 7.11
See application file for complete search history.

(56) References Cited

U.S. PATENT DOCUMENTS

| | | | |
|---|---|---|---|
| 5,446,891 A | 8/1995 | Kaplan et al. | |
| 5,574,828 A * | 11/1996 | Hayward et al. | 706/45 |
| 5,701,400 A | 12/1997 | Amado | |
| 5,732,397 A | 3/1998 | DeTore et al. | |
| 5,953,704 A | 9/1999 | McIlroy et al. | |
| 6,236,980 B1 * | 5/2001 | Reese | 705/36 R |
| 6,262,730 B1 | 7/2001 | Horvitz et al. | |
| 6,311,190 B1 | 10/2001 | Bayer et al. | |
| 6,334,127 B1 * | 12/2001 | Bieganski et al. | 1/1 |
| 6,412,012 B1 * | 6/2002 | Bieganski et al. | 709/232 |
| 6,836,773 B2 | 12/2004 | Tamayo et al. | |
| 7,213,009 B2 | 5/2007 | Pestotnik | |
| 7,233,908 B1 | 6/2007 | Nelson | |

OTHER PUBLICATIONS

Hindelang et al., A Dynamic Programming Algorithm for Decision CPM Networks, Operations Research Soc. Amer. Mar.-Apr. 1979 vol. 27, No. 2, pp. 225-241.

Exsys, Inc., 'Knowledge Automation Expert System Software', About Exsys CORVID, www.exsys.com.

Exsys, Inc., 'Exsys CORVID Java-Based Expert System Knowledge Automation Development & Deployment Technologies', 2004, www.exsys.com.

* cited by examiner

*Primary Examiner* — Romain Jeanty
(74) *Attorney, Agent, or Firm* — Wilson, Sonsini, Goodrich & Rosati

(57) ABSTRACT

A system and method for generating recommendations of analyses of circumstances in business, accounting, science, medicine and other fields. An algorithm is generated using an interactive generation process based on decision tree type inquiries. The algorithm is translated into a computer language and code and loaded onto a computer, preferably on a network. A user inputs data concerning a particular topic, and the algorithm processes the data to generate and display a set of recommendations or analyses. The user inputs additional data which the system uses to refine the initial recommendations or analyses, and this process is repeated until arriving at a final set of recommendations or analyses. The organization and content of sets of display screens changes dynamically as data is input and processed. The data may include degrees of certainty relating to certain data, which is used in both determining a set of recommendations or analyses and expressing a degree of certainty about such recommendations or analyses.

21 Claims, 24 Drawing Sheets

Module Home (Page Hierarchy)

| | |
|---|---|
| Module Home (Page Hierarchy) ........ 1 | Disclaimer ........ 9 |
| Background and Relevance Check ........ 3 | Potential Deal Structures (result of calculation) ........ 9 |
|     What this Module Is ........ 3 | Deal Structures Not Available (result of calculation) ........ 10 |
|     What this Module Is *Not* ........ 3 | |
|     Other Modules You Should Have Completed ........ 3 | |
| Lay of the Land / Required Materials ........ 4 | |
|     How this Module Works ........ 4 | |
|     What You Need to Have ........ 4 | |
|     Who Should Use This Module ........ 4 | |
| Objectives Assessment ........ 5 | |
|     Background ........ 5 | |
|     Objectives Assessment Tool ........ 5 | |
| Control Assessment ........ 6 | |
|     Background ........ 6 | |
|     Control Assessment Tool ........ 6 | |
| Consideration: Planned Payment ........ 7 | |
|     Background ........ 7 | |
|     Consideration Assessment Tool ........ 7 | |
| Measuring Success ........ 8 | |
|     Background ........ 8 | |
|     Success Measurement Assessment Tool ........ 8 | |
| Preliminary Recommendation ........ 9 | |

Fig. 1A

Module Home (Page Hierarchy)

Module Home (Page Hierarchy) .................................................................................. 1

Background and Relevance Check ............................................................................. 3

What this Module *Is* ........................................................................................... 3

What this Module Is *Not* .................................................................................... 3

Other Modules You Should Have Completed .................................................... 3

Lay of the Land / Required Materials .......................................................................... 4

How this Module Works ...................................................................................... 4

What You Need to Have ..................................................................................... 4

Who Should Use This Module ............................................................................ 4

Objectives Assessment ............................................................................................... 5

Background ......................................................................................................... 5

Objectives Assessment Tool .............................................................................. 5

Control Assessment .................................................................................................... 6

Background ......................................................................................................... 6

Control Assessment Tool ................................................................................... 6

Consideration: Planned Payment ................................................................................ 7

Background ......................................................................................................... 7

Consideration Assessment Tool ........................................................................ 7

Measuring Success ..................................................................................................... 8

Background ......................................................................................................... 8

Success Measurement. Assessment Tool ........................................................ 8

Preliminary Recommendation ..................................................................................... 9

Fig. 1B

Disclaimer ................................................................................................ 9

Potential Deal Structures (result of calculation) ........................................ 9

Deal Structures Not Available (result of calculation) ............................... 10

Fig. 2

Background and Relevance Check

**What this Module *Is***
This module is designed to help you assess possible alternative deal structures for a proposed investment. By assessing your strategic, tactical, and operational priorities, the module will generate a preliminary list of applicable deal structures. Refining those recommendations with detailed analysis, the module will provide:
- evaluations of possible alternative deal structures,
- the logic behind any recommendations, and
- a high level quantitative analysis of the structuring alternatives.

**What this Module Is *Not***
This module approaches deal structuring from a US GAAP (book) basis, and does not presently address any tax implications of possible structures. For detailed advice on these issues, please consult your professional services' advisor.

Other Modules You Should Have Completed
Though not required, PortBlue highly recommends that you complete the following modules before beginning this module:
- M&A Strategy
- Target Identification
- Due Diligence
- Valuation Proceed to next page ——— 22

Fig. 3

Lay of the Land / Required Materials

How this Module Works

This module asks a series of questions to determine potential deal structures for a given transaction. It proceeds with a series of high level questions to reach a preliminary recommendation of potential deal structures. To refine the preliminary results and isolate potential deal structures, users are then asked to complete a series of detailed analyses of four general categories:

- Business combinations (including purchase and pooling)
- Investments (including joint ventures, the cost method, the equity method, and the mark-to-market methods)
- Special-purpose entities
- Contractual arrangements

What You Need to Have

PortBlue recommends that you have the following materials available to you as you complete the module:

- Financial statements of the acquirer and target company
- Understanding of governance of the target entity (if applicable)
- Understanding of the expected inter-company transactions with target (if applicable)

Who Should Use This Module

This module was designed for use by the following individuals:

- Chief Financial Officer
- Chief Strategy Officer
- Comptroller/Accountant

<u>Begin Module Assessments</u> ──── 23

Fig. 4

Objectives Assessment — 26

Every deal structure reflects a strategic objective

Background — 30

To structure any successful transaction, you must begin with an assessment of the strategic objectives underpinning that deal. Presented below is a checklist that allows you to identify your strategic objectives. — 28

Objectives Assessment Tool

| 31 Objective: What are you acquiring? | Y | N | Cert. |
|---|---|---|---|
| Entire business | X | | |
| Intellectual property | | | |
| Human resources | | | |
| Distribution channel | | | |
| Product lines | | | |
| Manufacturing capacity | | | |
| Research capacity | | | |
| Access to capital | | | |
| Division or subsidiary | | | |
| Customers | | | |
| Cash flows | | | |
| Option / opportunity to purchase at a later date | | | |
| Good investment (buy to sell) | | | |

| 32 | Value | Certainty |
|---|---|---|
| Expected Acquisition Price / Value | X | (1-5) |

Proceed to next page — 34

Fig. 5

Control Assessment — 36

Your need for control affects the deal structure

40

Background

To understand the range of options available to your company, you must also understand the degree of control over the assets you desire after the transaction.

38

Control Assessment Tool

| Strategic Objective | Unilateral Control | Shared Control | No Control (passive) |
|---|---|---|---|
| Entire business | | | |
| Intellectual property | | | |
| Human resources | | | |
| Distribution channel | | | |
| Product lines | | | |
| Manufacturing capacity | | | |
| Research capacity | | | |
| Access to capital | | | |
| Division or subsidiary | | | |
| Customers | | | |
| Cash flows | | | |
| Option / opportunity to purchase at a later date | | | |
| Good investment (buy to sell) | | | |

42

Proceed to next page

Consideration: Planned Payment — 50

What payment method do you plan to use in your investment?

Background — 54

To understand the range of options available to your company, you must also determine how you plan to pay for your target in the transaction.

52

53

Consideration Assessment Tool

In the table below, please enter the dollar values of each form of consideration you will use in your investment, such that the total of the consideration equals the price of the investment. — 56

| Consideration | Value / Amount (if any) |
|---|---|
| Cash | |
| Debt | |
| Equity | |
| Property, plant, and equipment | |
| Intellectual property | |
| Human resources | |
| Other "soft" assets | |

58

Total       ACQUISITION PRICE

Proceed to next page — 59

FIG. 7

Measuring Success — 60

How will you determine if your deal was successful?

Background
To understand the range of options available to your company, you must also understand the measures that you will use to judge if your transaction was successful.

Success Measurement Assessment Tool

| Success Metric | Y | N | Cert. |
|---|---|---|---|
| Antidilution to EPS | | | |
| Operating income | | | |
| Tax incentives (NOLs, dividends) | | | |
| Return on assets | | | |
| Debt / equity ratio | | | |

(61)

Proceed to preliminary recommendations

Fig. 8A

Preliminary Recommendation

Disclaimer

When looking at the potential deal structures below, please note that there may be specific factors unique to your situation that may cause a different structure to be more appropriate. PortBlue recommends that you refine your answers further before consulting with your professional services advisor.

Potential Deal Structures (result of calculation

| Deal Structure | Description (brief) | Applicability |
|---|---|---|
| Business Combination: Purchase | <ul><li>Acquirer records identifiable assets and liabilities of target at "fair value" (including identifiable intangibles)</li><li>Excess of purchase price plus purchase expenses over fair value of identifiable net assets acquired is recorded as goodwill</li></ul> | |
| Business Combination: Pooling | <ul><li>Financial statements for current and prior years are restated to retroactively combine the operations of the combining companies as if they always-had been merged together</li><li>Assets and liabilities of combining companies continue to be recorded at historical cost (no step up in basis of assets or liabilities)</li></ul> | |

Fig. 8B

Deal Structures Not Available (result of calculation)

| Deal Structure | Description (brief) | Reasons not suitable |
|---|---|---|
| Investment: Corporate Joint venture . | • Control and financial interest are equally shared by a small group of businesses in a separate and specific business or project for mutual benefit of the members.<br>• Assets contributed to the venture are generally recorded at carry-Over basis, resulting in no gain or loss for the contributor and improved earnings for the new entity. | |
| Investment: Equity Accounting Method | • Treated as partial-step acquisitions with the original investment recorded on the balance sheet at cost.<br>• As the target earns income, the acquirer increases its investment in the target (balance sheet), as well as its own net income (income statement) by the acquirer's proportionate interest in the target's net income. | |
| Investment: Mark-to-Market Methods | • The accounting for a held investment depends on the type of security, its marketability and the intent of the holder. | |
| Investment: Cost Accounting Method | • The cost method is used for investments in non-marketable equity securities for which an investor has minimal or passive influence.<br>• The investment is recorded on the balance sheet at cost, and maintained on the books as | |

FIG. 8C

| | | |
|---|---|---|
| | such, except for dividends and impairment. | |
| Investment: Investment Company | • Must be Written | |
| Special Purpose Entity | • A leveraged financing approach (creating a separate entity) used to facilitate cost activities such as pharmaceutical / medical research or technological development | |
| Leveraged Buyout / Recapitalization | • An approach whereby debt and equity are used to pay out the majority of existing shareholders while maintaining purchase adjustments at the parent level.<br>• Results in no step-up basis for target. | |
| Contractual Arrangements | • Must be written | |

Change Answers Above ⟵ 70

Proceed to Detailed Analysis: Business Combinations

Figure 9A

Module Home (Page Hierarchy)

Module Home (Page Hierarchy) .................................................................................. 12

Business Combination Accounting .............................................................................. 14

Background: Purchase vs. Pooling ............................................................... 14

Purchase Method: Accounting Implications ................................................. 14

Pooling Method: Accounting Implications .................................................... 14

New FASB rulings (EMOTICON) ................................................................. 14

Required Materials ..................................................................................................... 15

What You Need to Have ............................................................................... 15

Who Should Complete this Module .............................................................. 15

Initial Questions ......................................................................................................... 16

Is this a Business Combination? .................................................................. 16

Combination Tool (must be written) .............................................................. 16

Which is the Acquiring Entity? ...................................................................... 16

Acquiring Entity Tool (must be written) ......................................................... 16

Purchase vs. Pooling .................................................................................................. 17

Purchase vs. Pooling is *Not* an Election ..................................................... 17

Disclaimer .................................................................................................... 17

Pooling Assessment Tool ............................................................................. 17

Applying the Pooling Method ...................................................................................... 18

Pooling May Remain Available to You ......................................................... 18

Applying the Pooling Method ....................................................................... 18

Assessment Tool ......................................................................................... 18

Figure 9B

| | |
|---|---|
| Pooling Method Application: Results | 19 |
|     Impact on Financial Statements (must be written) | 19 |
| Applying the Purchase Method | 20 |
|     Pooling Does Not Apply to Your Transaction | 20 |
|     Applying the Purchase Method | 20 |
|     Assessment Tool | 20 |
| Purchase Method Application: Results | 21 |
|     Allocating the Purchase Price | 21 |
| Appendices: Definitions | 22 |
|     Acquiring Entity | 22 |
|     Business Combination | 22 |
| Business Combinations: Numerical Example | 23 |
|     Assumptions for the Example | 23 |
|     Pooling Method Example | 23 |
|     Purchase Method Example | 23 |
|     Pooling vs. Purchase | 23 |
| Appendices: Recognition of Liabilities in Purchase Accounting | 24 |
|     Exit Costs | 24 |
|     Termination Benefits and Relocation Costs | 24 |

Fig. 10

Business Combination Accounting

[71]

Background: Purchase vs. Pooling

Purchase and pooling methods of accounting are available when a business combination takes place. However, it is important to note that the pooling of interests method of accounting is *not an election*, but can only be used when 12 specific conditions are met. If all of the conditions are not met, then the business combination would be treated as a purchase.

Purchase Method: Accounting Implications

The purchase method assumes one organization acquires another:

- Acquirer records identifiable assets and liabilities of target at "fair value" (including identifiable intangibles)
- Excess of purchase price plus purchase expenses over fair value of identifiable net assets acquired is recorded as goodwill [72]
- Direct expenses of the purchase are capitalized (acquiring entity)
- Negative goodwill
- Income statement includes operations of acquired company subsequent to acquisition date.

Pooling Method: Accounting Implications

The pooling method assumes that the two organizations have always been one entity:

- Assets and liabilities of combining companies continue to be recorded at historical cost (no step up in basis of assets or liabilities)
- Financial statements for current and prior years are restated to retroactively combine the operations of the combining companies as if they always had been merged together [73]
- No adjustments are made to the financial statements except for intercompany balances and transactions
- Costs of pooling are charged to expense see numerical examples [82] [84]

New FASB rulings

This section enumerates the state of the FASB rulings on the issue.
Which method applies to my situation? [86]

Fig. 11

Required Materials

What You Need to Have
This section lists the materials necessary to complete the module meaningfully.

Who Should Complete this Module
It also recommends particular individuals who may want to contribute to the module.

Proceed to next page

Initial Questions

Is this a Business Combination?
To determine if the purchase method is appropriate, we must first determine if a business combination is taking place...

Combination Tool (must be written)

| 92 | | Y | N |
|---|---|---|---|
| | Questions to understand if this is a BC: | | |
| | Questions to understand if this is a BC: | | |

Which is the Acquiring Entity?
We must also determine which is the acquiring entity?

Acquiring Entity Tool (must be written

| 94 | | Y | N |
|---|---|---|---|
| | Questions to understand which is acquiring entity: | | |
| | Questions to understand which is acquiring entity: | | |

98

Proceed to next page

Fig. 13

Purchase vs. Pooling.

**Purchase vs. Pooling is *Not* an Election**
The pooling of interests method of accounting is not an election, but can only be used when 12 specific conditions are met. If all of the conditions are not met, then the business combination must be treated as a purchase.

Disclaimer
This tool is designed to give you a preliminary indication of whether you might qualify for pooling accounting. It does not constitute professional advice, and you should confirm these results with your professional services advisor.

Pooling Assessment Tool

| Attributes of Combining Enterprises | Y | N |
|---|---|---|
| Entities autonomous? (is one company a subsidiary of the other?) | | |
| Entities independent? (greater than 10% cross-ownership?) | | |

102

| Manner of Combining Interests | Y | N |
|---|---|---|
| Is the single transaction or plan completed in one year? | | |
| Voting common-stock for voting common-stock? | | |
| Changes in equity interests were not in contemplation? | | |
| Absence of treasury stock transactions? | | |
| Each shareholder treated equally / proportionately? | | |
| Are any shareholders restricted or deprived of rights? | | |
| Contingencies resolved? | | |

104

| Absence of Planned Transactions | Y | N |
|---|---|---|
| Planned share repurchases? | | |
| Are there any special financial arrangements? | | |
| Planned dispositions of assets? | | |

106

Proceed to next page — 108

Fig. 14

Applying the Pooling Method

Pooling May Remain Available to You
Based on a preliminary assessment only, your transaction continues to qualify for use of the pooling method.

Applying the Pooling Method
The following tool will help you analyze what impact the planned business combination will have on your financial statements as a result of applying the pooling method

Proceed to next page — 112

Fig. 15
Pooling Method Application: Results
Impact on Financial Statements
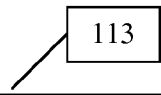
| | |
|---|---|
| | (from above) |
| | (from above) |
| | (calculated) |
| | |
| | (from above) |
| | (from above) |
| | (calculated) |
| | |
| | (calculated) ' |
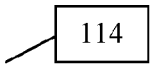
Back to main module

Fig. 16

Applying the Purchase Method

Pooling Does Not Apply to Your Transaction
Based on a preliminary assessment only, your transaction does not qualify for pooling of interests for the following reasons:

115
- Reason 1
- Reason 2
- Reason 3

Applying the Purchase Method
The following tool will help you analyze what impact the planned business combination will have on your financial statements as a result of applying the purchase method.

Assessment Tool

116
| Price paid for acquiree | (data entered) |
|---|---|
| Direct purchase costs | (data entered) |
| Identifiable assets @ FV | (data entered) |
| Identifiable liabilities @ FV | (data entered) |

Proceed to next page

Fig. 17

Purchase Method Application: Results (completed only if pooling not available & data entered above)

Allocating the Purchase Price

118 →

| | |
|---|---|
| Price paid for acquiree | (from above) |
| Direct purchase costs | (from above) |
| Total purchase price | (calculated) |
| | |
| Identifiable assets @ FV | (from above) |
| Identifiable liabilities @ FV | (from. above) |
| Identifiable net assets | (calculated) |
| | |
| Excess purchase price. over net assets acquired (goodwill) | (calculated) |

Back to main module — 120

Fig. 18

Appendices: Definitions

Acquiring Entity
- The acquiring entity is presumed to be the group of shareholders that receives the largest voting interest in the combined entity.
- The larger entity normally issues stock to acquire all of the voting interests of the smaller entity and retains the greatest share of voting interest after the transaction.

Business Combination

What is a business?
- A business consists of substantive operations
- Resolved ambiguity in existing rules for exchanges of "similar productive assets" and "businesses"

*What is a combination?*
- Occurs when a corporation and one or more businesses are brought together into one accounting entity. More than one legal entity may remain.
- The remaining, single entity carries on the activities (operations) of the previously separate, independent enterprises.
- Results in "consolidated financial statements" when the separate legal
- existence of an entity remains after the combination (subsidiaries)

Fig. 19

Business Combinations: Numerical. Example

Assumptions for the Example

This example demonstrates the impact of the pooling vs. purchase methods on an acquirer's financial statements. It is based on the following assumptions:
- The Acquirer issues 5 million shares of common stock to acquire 100 percent of outstanding shares of the Target
- Fair value/quoted market price of Issuing Company is $10 per share
- Book value of Target's net assets is $10 million.

Pooling Method Example

|  | Issuer | Target | Combined |
|---|---|---|---|
| Current assets | 250 | 50 | 300 |
| Depreciable assets | 50 | 5 | 55 |
| Intangible assets | 20 | 0 | 20 |
| Goodwill | 0 | 0 | 0 |
| Liabilities | (240) | (45) | (285) |
| Net Assets | 80 | 10 | 90 |

Purchase Method Example

|  | Issuer | Target | Combined |
|---|---|---|---|
| Current assets | 300 | 0 | 300 |
| Depreciable assets | 55 | 5 | 60 |
| Intangible assets | 20 | 10 | 30 |
| Goodwill | 0 | 20 | 20 |
| Liabilities | (285) | 5 | (280) |
| Net Assets | 90 | 40 | 130 |

Pooling vs. Purchase

|  | Pooling | Purchase | Difference |
|---|---|---|---|
| Current assets | 300 | 300 | 0 |
| Depreciable assets | 55 | 60 | (5) |
| Intangible assets | 20 | 30 | (10) |
| Goodwill | 0 | 20 | (20) |
| Liabilities | (285) | (280) | (5) |
| Net Assets | 90 | 130 | 40 |

Fig 20

Appendices: Recognition of Liabilities in Purchase Accounting

Exit Costs
- *Not* associated with future revenues
- *Not* incurred to generate revenues
- Have no future economic benefit
- Incremental
- Incurred as- a direct result of plan to exit
- Represent contractual obligation
- Plan to exit activity of *acquired* company

Termination Benefits and Relocation Costs
- Acquired company employees only
- Plan of termination (relocation) with specific identification of number, classification, and location
- Communication of termination benefits to employees
- Plan completed in near term - changes not likely

DECISION MAKING AND IMPLEMENTATION SYSTEM

CROSS REFERENCE

This application is a continuation of U.S. application Ser. No. 09/811,311 filed Mar. 16, 2001, now U.S. Pat. No. 7,376, 576, which is hereby incorporated herein by reference in its entirety.

FIELD OF THE INVENTION

This invention relates to the field of logic systems and devices for assisting in the making of decisions or otherwise weighing alternatives in complex factual scenarios. The system and devices also are useful in preparing and implementing plans for complex analysis. The invention has applicability in, among other areas, analysis and decision-making in business settings such as due diligence or structuring conducted in connection with a business transaction, or considering and implementing employee-retention systems. The invention may also be used in any other setting requiring logical analysis of complex systems, such as science and medicine.

BACKGROUND OF THE INVENTION

Decision-making and analysis in business, as well as in other fields, has traditionally been conducted in an ad-hoc manner. In the business setting, a decision-maker such as an executive in finance or business development or some other manager gathered facts he deemed material to the decision and employed in-house advisors or referred to outside expert consultants. Alternatives were discussed and weighed, and decisions were made.

Such an approach can be flawed in several ways. Because the approach is not systemized, the decision may be made without a complete and accurate collection of important factual data. In other words, there may not be a "checklist" for ensuring that all of the desired facts are input into the decision-making process. As a result, facts that should be weighed are not, and it is even possible that facts that should not be weighed are. For example, outside expert consultants especially will make assumptions about the goals that the decision-making process seeks to achieve or even about the applicable factual setting. These assumptions, based largely on the outside expert consultant's experience, may not be accurate in all cases. Moreover, the outside expert consultant may be so ingrained with his past experience that he may make these assumptions without even being aware of doing so.

The quality of both in-house advisors and outside expert consultants varies widely. Even the established professional service firms such as large accounting firms, law firms and management consultant firms that have well-deserved reputations for quality and creativity, occasionally rely too heavily on relatively junior and inexperienced people. The lesser known firms include highly-competent professionals along with less-competent individuals. In-house advisors tend to know the company business quite well in comparison to outside expert consultants, and are therefore less prone to factual mistakes, but often are not steeped in the area that is the subject of an important decision; for example, an in-house advisor usually does not analyze sizeable mergers of his company on a day-to-day basis.

The decision-making process and analysis that is traditionally employed does not document the process well. Because the systems tend to be experiential and intuitive, there is little record of why a decision was made or the facts upon which it was based. This is particularly problematic if the decision is later challenged by shareholders or others.

In addition to all the flaws, outside expert consultants are usually quite expensive. It has been estimated that in the United States alone businesses spend over $200 billion annually on consultants, lawyers, accountants and other specialty advisors. As noted above, some of this money may be spent for services that are often misdirected, often not delivered on a sufficiently timely basis, occasionally incompetent, and usually poorly documented.

There have been attempts at developing more systematic and documented routines for decision-making using modern computer techniques and databases. So-called "business intelligence software providers" such as Hyperion Solutions, Microstrategy and Cognos offer software designed to front-end with existing user databases and ERP systems. This software mines information residing elsewhere in the user's organization to provide managers with real-time operational statistics such as amount in inventory and daily sales figures. Such software, however, is not especially designed for the decision-making process, but rather for quick access to rapidly changing information about the user's organization.

Another source of information and decision support services is management education providers and the executive-training centers at many of the college and university business schools. These organizations issue reports, present conferences and provide training to disseminate management "best practices." This is a highly fragmented industry with a largely ad hoc approach which seldom offers a saleable and scaleable product for systemized decision-making.

Business information providers such as Bloomberg, Gartner Group, Forester and Hoovers provide both synthesized and unsynthesized business information. The expertise of these groups is usually specific to particular industries (such as technology in the cases of Gartner and Forester) or specific to particular kinds of information (such as debt and credit ratings in the case of Standard & Poor's). These organizations have a high degree of expertise in their developed fields of information, but do not offer wide ranging products that systemize the decision-making process for general application.

It can be appreciated that there is a need for a system that takes advantage of the sizeable databases available in, and the high processing capability of, modern numeric processing equipment to deliver decision support and implementation. Such a system should ideally produce sound recommendations based on considered analysis utilizing flexible databases containing extensive information. In a preferred embodiment, such a system would be interactive with and tailored to the specific needs and circumstances of each user, and would document for later retrieval the analysis made, the outcome, and the input facts relied upon.

In addition, such a system would ideally take advantage of large private and public networks such as the Internet. The use of the Internet would allow near-universal access and a concurrent presentation platform and user interface, and also allow the system to draw on the vast information content available on world-wide Internet servers. Finally, such a system ideally would take advantage of the expertise and goodwill held by existing professional service and consulting firms.

SUMMARY OF THE INVENTION

The present invention addresses these and other shortcomings in the prior art. In a preferred embodiment, the invention is presented as a set of Internet-based decision-support tools in an application service provider ("ASP") format, but may also be presented in other formats that are not ASP-related or do not utilize the Internet, such as by diskettes, CD ROMs or programs downloaded via a public or private network, all as discussed in greater detail below.

The system can be used in a variety of decision-support and analysis applications, including, without limitation, business applications such as mergers and acquisitions, annual strategic planning, employee relations, due diligence, globalization strategy and implementation, risk management, and compensation. The system is also applicable in analyzing other complex systems, including in science, medicine, engineering.

The invention has several aspects. One aspect involves the methodology of providing expert decision-making support through an easily-accessible network such as the Internet utilizing software that is optimized for the particular field that is the subject of the decision or analysis. The tools are presented in a hierarchy of modules, submodules and pages containing information and requesting data from the user in the manner described below. The owner or licensee of the system realizes revenue on the user's use of the system through a scheme of user subscription fees or per-use fees or a blended fee approach.

Expert assistance in designing the system, and market recognition, is achieved, in part, by cooperative arrangements with well-known professional service or consulting firms. These firms benefit from the exposure they receive in being associated with the product and from client referrals via the product. They may also receive fees for their services in the form of traditional hourly fees, fees based on the extent of use of the particular product with which their name is associated, fees per unit of time (such as fixed monthly fees) or any combination of the foregoing. In an Internet implementation, the website presenting the system can be hyperlinked to other websites including those of the professional service and consulting firms involved in developing the system. The system also tracks the use of the materials developed by the professional service and consulting firms and provides such tracking information to those firms for their marketing and business use.

One function of the system is to frame complex tasks and issues, and to organize and implement decisions faster and more effectively using decision modules. At the same time, the system archives electronically the flow of decision-making for future reference. A second function is to allow product managers operating in the organization that owns or leases the system to interact with outside experts efficiently and to create new decision-making modules and to update existing modules.

The kinds of decision-support modules in the system include general modules with applicability for a wide range of decision support; industry-specific modules for ascertaining data specific to particular industries and with input inquiries directed toward those industries; products that are created especially for a particular company or division of a company; and modules that are customized for several companies or groups of companies. These kinds of modules, and the several modules within each kind, share certain logical frameworks or architectures summarized below and described in greater detail under the heading, "Detailed Description of a Preferred Embodiment."

The base unit in the logical framework is a module itself. A module is a set of interrelated content with a defined purpose. Each module may be a "submodule" in relation to a module that is in a higher level of the hierarchy; and each module may have submodules in relation to it. A characteristic of modules, whether or not they have submodule status in relation to other modules or have other modules that are submodules in relation them, is that they output a discrete decision or analysis with respect to their subject matter. In addition, they have associated information such as bywords, date of creation or update, and a grouping of page hierarchy. A module may also have or include branding or URLs of companies or firms that contributed to its creation or maintenance, and biographical information for experts.

A page is the basic individual unit of presentation of information within a module. Pages are grouped into sections of one or more pages and each section has a priority. Like modules, sections may contain several other sections which are subsections in relation to the sections in which they are contained. Each section is assigned a priority number. When the system navigates into a section, the priority number of the sections at the same level are noted, and the section with the highest priority level is navigated to next.

Each page includes a number of attributes. One is the page precondition which specifies a formula or other terms and the conditions under which a client is allowed to access the page. These conditions may be, for example, suitable answers to specific queries posed to the client which establish the page's applicability. The outcome of a condition formula must be binary, i.e., yes or no, so that the page is either presented or not presented.

The page priority is a number applicable to the data elements on the page. This priority applied to the data elements is used in the maximum impact procedure and the calculated importance procedure described below, but does not affect client navigation. In a preferred embodiment, numeric priority ranges from 1 to 100, but any range scheme may be used.

The page is typically broken into a useable number of separate paragraphs. Each paragraph is identifiable by an associated header, the text of the paragraph, and data elements or Formulae if applicable. Paragraphs may also include predefined icons in the margin that suggest the content of the associated text (sometimes referred to as "emoticons").

The pages also include names which label each page in the page hierarchy, headers to briefly describe the page contents to a user, visited indicia to record client visits to the page (which may or may not be displayed), a text element called "notes" which the client can use to record his user notes pertaining to the page, and a list of attachments which are files available for download from the page. Also on the page in a preferred embodiment may be indicia for "done" and "results." The "done" indicia indicates that all information sought from the user has been input. The "results" indicia indicates that the results that the system has determined are now available for a server module or section.

Also in a module, along with pages, are data elements. These are the basic units for storing client information, and are catalogued according to the module in which they are entered. Each data unit has the attributes of name, descriptor, source, (either input or calculated), cardinality, value type, text of the question associated with the data, value, value default, the level of certainty associated with the data, expressed as a unit in a range, choice, Minimum and Maximum, numeric range, formulae for the calculated data elements, and priority for use in the maximum impact procedure and the calculated importance procedure. The nature of some of these attributes may not be apparent from their names. Cardinality refers to the number of values that a data element may have. Although most data elements may have only one value, such as a number, others may have several values, such as context information. Value type refers to the actual data type for the data element; it may be a Boolean operator, a number, a choice, text or of other types. Choice refers to the set of possible choices associated with a data element. Minimum and maximum are the defined bounds for a numeric data element; for example, a data element representing the number of employees of a company could have a minimum of zero but could not have a minimum equal to a negative number. The numeric range refers to the range bounded by the minimum and maximum values.

The data elements also include an attributed context describing membership and constraints on usage. Regarding membership, the context indicates the potential usage of the data elements. For example, formulae applicable for potential merger partners may be specified for the context of an individual company that is a potential merger partner or for a group of "merger partners." Regarding constraint or usage, the context may limit the applicability of the data element. For example, a data element "revenues" with a context of 1998 would not normally be applicable to the year 1999.

Finally, the modules may include formulae that perform operations on data elements. The formulae can utilize logical clauses such as AND/OR, or =, and operators such as, −, *, / in the case of numeric data elements. Functions are defined to perform special operations too; for example, the function xyplot (title, x, y) can be used to generate a graphic element showing x as a function of y. Other special functions are described under "Detailed Description of a Preferred Embodiment" below.

One of the important aspects of the present invention is the ability to focus in on a topic and a recommendation incrementally. In prior art systems, the approach is typically to input the information necessary to make a decision, process that information in accordance with some predetermined algorithm, and output the result. This approach is unresponsive to the desires of the users to obtain a particular outcome, because it simply gives an answer without revealing the reasoning behind that answer. Further, it wastes user time and processor power by completely processing the matter even if the user is interested in only a preliminary conclusion or a portion of the answer.

The present system asks for the necessary information a portion at a time, processes that portion, outputs the result, and then goes to another portion. The user is thus free to abort the process when it takes a route that is undesirable, is incompatible with the final desired conclusions, or is simply sufficiently detailed for the present purposes without going further. This approach also enables the user better to see the logic at work in arriving of the conclusions, in order to experiment with alternative input information to arrive at the desired conclusions.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 1A and 1B depict a non-limiting example of a page hierarchy for a module for structuring alternatives in a proposed investment, in this case, a hierarchy including submodules addressing: Background and Relevance Check, Lay of the Land/Required Materials, Objectives Assessment, Control Assessment, Consideration; Planned Payment, Measuring Success, and Preliminary Recommendation.

FIG. 2 depicts a non-limiting example of a first substantive page for a user in a module for structuring alternatives in a proposed investment, in this case, a page including paragraphs describing: What this Module Is, What this Module is Not, and Other Modules You Should Have Completed.

FIG. 3 depicts another non-limiting example of an informational page in a module for structuring alternatives in a proposed investment, in this case, a page explaining to the user the manner in which the module operates.

FIG. 4 depicts another non-limiting example of a page in a module for structuring alternatives in a proposed investment, in this case, a first page requesting user data input.

FIG. 5 depicts another non-limiting example of a page in a module for structuring alternatives in a proposed investment, in this case, a page asking for information about the user's desired control over the business or particular assets being acquired.

FIG. 6 depicts another non-limiting example of a page in a module for structuring alternatives in a proposed investment, in this case, a page requesting user data input in the form of a table for the user to enter input data dividing the purchase price into categories for consideration.

FIG. 7 depicts another non-limiting example of a page in a module for structuring alternatives in a proposed investment, in this case, a page requesting user data input in the form of a table eliciting input data about the metrics that the user will use to measure whether the proposed acquisition shall have been successful.

FIGS. 8A, 8B, and 8C depict another non-limiting example of a page in a module for structuring alternatives in a proposed investment, in this case, a page offering preliminary recommendations.

FIGS. 9A and 9B depict a non-limiting example of a page hierarchy for a module for selecting a business combination accounting method, in this case, a hierarchy including submodules addressing: Business Combination Accounting, Required Materials, Initial Questions, Purchase vs. Pooling, Applying the Pooling Method, Pooling Methods Application: Results, Applying the Purchase Method, Purchase Method Application: Results, Appendices: Definitions, Business Combinations: Numerical Example, and Appendices: Recognition of Liabilities in Purchase Accounting.

FIG. 10 depicts a non-limiting example of a page for a user in a module for selecting a business combination accounting method, in this case, a page including paragraphs describing: Background: Purchase vs. Pooling, Purchase Method: Accounting Implications, Pooling Method: Accounting Implications, and New FASB Rulings.

FIG. 11 depicts a non-limiting example of a page for a user in a module for selecting a business combination accounting method, in this case, a page describing the methods required for the section.

FIG. 12 depicts a non-limiting example of a page for a user in a module for selecting a business combination accounting method, in this case, a page inviting responses to two sets of questions designed to obtain facts necessary to the determination whether the proposed transaction constitutes business combination and the determination of the acquiring entity tool.

FIG. 13 depicts a non-limiting example of a page for a user in a module for selecting a business combination accounting method, in this case, a page designed to determine whether the pooling method of accounting is available for the transaction.

FIG. 14 depicts a non-limiting example of a page for a user in a module for selecting a business combination accounting method, in this case, a page displayed if the system determines that pooling is available.

FIG. 15 depicts a non-limiting example of a page for a user in a module for selecting a business combination accounting method, in this case, a page showing pro form a financial statements under pooled accounting.

FIG. 16 depicts a non-limiting example of a page for a user in a module for selecting a business combination accounting method, in this case, a page displayed if the system determines that pooling is not available.

FIG. 17 depicts a non-limiting example of a page for a user in a module for selecting a business combination accounting method, in this case, a page showing the pro form a results of the proposed transaction of the financial statements of the acquiring company using the purchase method of accounting.

FIG. 18 depicts a non-limiting example of a page for a user in a module for selecting a business combination accounting method, in this case, a page devoted to defining several terms used in the module for the convenience of the user.

FIG. 19 depicts a non-limiting example of a page for a user in a module for selecting a business combination accounting method, in this case, a page devoted to an example of the pooling method versus the purchase method of accounting in a hypothetical acquisition.

FIG. 20 depicts a non-limiting example of a page for a user in a module for selecting a business combination accounting method, in this case, a page showing an outline of appendices to the module describing certain additional ramifications of the outcome.

DETAILED DESCRIPTION OF A PREFERRED EMBODIMENT

The invention can be illustrated with examples. It is important to recognize that the invention extends beyond the specific examples, and to the more general use of the hierarchical system and overall organization and methodology, as expressed in the claims below. These examples merely serve to illustrate a use of the invention.

One embodiment involves a module for structuring alternatives in a proposed investment. This module assesses strategic, tactical and operational priorities to generate a preliminary list of potential deal structures. This preliminary list is refined with detailed analysis and additional user input to provide evaluations and recommendations of the several potential structures, the logic behind the recommendations, and a high level quantitative analysis.

FIGS. 1A and 1B show the page hierarchy for the module. In a sense, the page hierarchy is a table of contents; however, it changes dynamically in the manner shown below as the system processes input information. The first substantive page for the user is the "Background and Relevance Check" page, shown in FIG. 2. That page briefly describes the purpose of the module, identifies operators for which the module is intended, and alerts the user that there are certain other modules that the user should have completed prior to undertaking this module (the merger and acquisition module, the target identification module, the due diligence module and the valuation module in this case). In this particular example, these other modules are merely recommended; alternatively, this module could incorporate these other modules as submodules or otherwise require their completion as a precondition to proceeding in this module. The user advances to the next page in the module by clicking on the "Proceed to next page" phase 22.

The next page, shown in FIG. 3, is another informational page, explaining to the user the manner in which the module operates. There are two main phases to the operation of this module. First, a series of questions are posed in order to generate input data. This data is processed in the manner described below to produce a preliminary recommendation of potential deal structures. That preliminary recommendation then is refined and the potential deal structures are narrowed by posing a series of additional questions through other sections or submodules of the module.

This page in FIG. 3 also informs the user of the materials he may wish to have at hand for answering the questions to be posed, and indicates the type of individual who will most likely benefit from, and have sufficient expertise in using, the module, namely a chief financial officer, chief strategy officer, or a comptroller in this particular example. The user advances to the next page by clicking on the "Begin Module Assessments" phrase 23.

The next page, shown in FIG. 4, is the first page of the module to request user data input. The heading 26 "Objectives Assessment" provides a shorthand summary of the page contents. A paragraph 28 bearing a heading 30 of "Background" explains briefly what is being accomplished in the page. In other words, this page asks the user to specify as input data the objectives underlying the proposed insertion. The first step in that process is to input the portions of the business sought to be acquired.

This information is elicited through a table 31 asking yes or no questions, beginning with the question whether it is the "Entire Business" that is sought to be acquired. If the answer is yes, then the answers to the remaining questions in the table which are directed toward whether certain portions of the business are being acquired can be ignored. If the answer to the question whether the entire business is proposed to be acquired is no, then the user goes on to answer the remaining questions in the table about which particular portions of the business are being acquired.

The table 31 also elicits from the user information about the certainty of his answers to the questions, on a scale from 1-5 in this example. This "certainty" information is used by the system in a variety of ways. In some determinations, the degree of certainty directly affects the determination, as is the case when a relatively high degree of certainty is necessary before undertaking a particular kind of transaction or assuming a particular kind of risk. The certainty information is also used in expressing the likelihood that a given recommendation is the correct one; the certainty of the output is thus dependent upon the certainty of the input. This simple syllogism becomes much more complicated when one recognizes that the weight given to the input variables varies with different output recommendation. A relatively low degree of certainty in a given data element may therefore result in a relatively low degree of certainty in the output recommendation for one output recommendation but not for another. The certainty information is dealt with according to logical precepts. For example, input data x may be highly certain and output data y may be highly uncertain. If calculated data element z=x or y, then the certainty of z is highly certain. But if z=xy, then the certainly of z would be highly uncertain.

Similar to certainty information is importance information. A user may consider a particular outcome or recommendation to have a particular degree of importance, or the system itself may be programmed to assign to a particular outcome or recommendation a particular degree of importance. For example, certain tax or accounting treatment for a transaction may be considered important under some circumstances. Notably, such treatment may not be considered important under other circumstances, and the system can be programmed to distinguish between such circumstances. The outcome or recommendation that is assigned a particular degree of importance, like other outcomes or recommendations, is based directly or indirectly on input data, and is presented in a set of one or more display screens. The input data upon which a recommendation with an assigned degree of importance is based is also assigned degrees of importance. The degree of importance assigned to such input data is based on (1) the degree of importance assigned to the recommendation that it helps to determine, and (2) the criticality of such item of input data in making that determination. Some items of input data, for example, will have relatively low degrees of importance even though they are related to recommendations of relatively high degrees of importance, because they play only a small role in determining those recommendations of high degrees of importance, and conversely. The assigned or determined degrees of importance of input data can be used to identify screens for display to the user in presenting the recommendations and ways to change the recommendations.

Another table 32 on this page solicits for input the expected price of the proposed acquisition together with the user's level of certainty with respect to the price that he inputs. This information is also used in subsequent pages. The user advances to the next page by clicking on the "Proceed to next page," phrase 34 of this page.

The next page, shown in FIG. 5, asks for information about the user's desired control over the business or particular assets being acquired. As in the previous page, there is a page name 36 and a paragraph 38 with a heading 40. The information in this example is elicited through a table 42 setting forth the business portions being acquired and providing a set of four choices for the user: "Unilateral control," "Shared Control," "Influence" or "No Control (passive)." The user checks a box in each row for each business portion proposed to be acquired. The user can then advance to the next page by clicking on the phrase 46, "Proceed to next page."

The relationship between the page in FIG. 5 and the page in FIG. 4 is one of precondition. That is, the information sought in FIG. 4 must be entered before the information sought in FIG. 5 can be entered. The system logic thus will not advance the user from the page of FIG. 4 to the page of FIG. 5 until the page of FIG. 4 information is indeed entered. If the user seeks to advance from the page of FIG. 4 to the page of FIG. 5 by clicking on the "Proceed to next page" phrase 46 of the page of FIG. 4 without that information being entered, the system will alert the user to the error and prompt him to correct it.

The next page is shown on FIG. 6. This page bears the heading 50 "Consideration: Planned Payment," a paragraph 52 with the heading 54 "Background" and the paragraph 56 with the heading 53 "Consideration Assessment Tool." It also includes a paragraph 58 that takes the form of a table for the user to enter input data dividing the purchase price into categories of consideration. The price may include, for example, the payment of cash, the assumption of debt, the transfer of equity, and so on. The user proceeds to the next page by clicking on the "Proceed to next page" phrase 59.

The next page, shown in FIG. 7, bears the name 60 "Measuring Success" and includes table 61 entitled "Success Measurement Assessment Tool." This table elicits input data about the metrics that the user will use to measure whether the proposed acquisition shall have been successful, and the certainty of the answers. These pages complete the information presented to the user and solicit the necessary information for the system to make preliminary recommendations.

The system makes these preliminary recommendations based upon decision trees established with the assistance of experts in the field that is the subject of the decision. In the example here, the decision tree is established with the help of accounting and business consulting experts. In practice, this is done by an iterative process to produce a "decision free" type algorithm. A trained individual begins by interviewing one or more experts in the field, and reducing their input to a schematic or narrative decision tree that covers the principal scenarios. One or more subsequent interviews then refines and elaborates upon the decision tree. The decision tree can be tested with actual or hypothetical input data with respect to which certain correct outputs are expected. If there is a discrepancy between the actual outputs of the system and the expected outputs, or a bug in obtaining outputs, the bugs or discrepancies can be corrected. Finally, the decision tree is translated into a computer language and programmed into the computer.

The preliminary recommendations are presented on the next page, shown in FIGS. 8A, 8B and 8C. It can be seen that the system has preliminarily recommended ten alternative arrangements for the proposed transaction, listed in a table 62 under the column 64 "Deal Structure." The text under the next column 65 briefly describes each alternative under the last column 66. Note the applicability of each alternative may be a numerical ranking of the recommendations, a presentation of special issues for consideration, or other information. The user at this point in the process now has a general sense of some of the factors that dictate a structure for his transaction and a description of several alternative structures for his transaction. The next step is to refine the analysis.

Before proceeding to that next step, however, the user can change his input data to observe the resultant changes in the preliminary recommendations 70. This is done by going to the page hierarchy or module home page revisiting the pages to be changed, making the desired change, and returning to the Preliminary Recommendations page shown in FIGS. 8A, 8B and 8C. The change in input data can be either with respect to the substantive data itself or with respect to the degree of certainty attached to particular data. This is a very valuable way for the user to understand the importance and weight assigned to the factual scenario surrounding the proposed transaction.

The page hierarchy shown in FIG. 1 functions as a dynamic table of contents. When the user has entered sufficient input information and the system has processed that information sufficiently to develop some conclusions or preliminary output, the initial standard page hierarchy shown in FIG. 1 can be revised to so reflect. The revision can take the form of presenting a page hierarchy that outlines some of the topics that have been determined to be applicable in greater detail, or deleting others determined not to be applicable, or substituting a wholly different page hierarchy. The system thus incrementally receives necessary input information, processes that information, presents results of that processing, and sends additional information based on the results of the processing. Unlike some prior art systems the present system does not expand large amounts of processing power or consume large amounts of user time in inputting or processing all the information conceivably necessary to analyze a given topic; instead it receives input and processes that input incrementally to arrive at output that is narrow and tailored to the degree desired by the user.

The business combination submodule section of the module begins with the page hierarchy shown in FIGS. 9a and 9b, followed by the "Business Combination Accounting" page shown in FIG. 10. This page begins with a paragraph 71 having a short explanation of the point at issue and then two further paragraphs 72 and 73 outlining some of the accounting implication to the two approaches.

Numeric examples of the two accounting methods are available to the user by clicking on the "see numeric examples" phrase 82. That links to the page shown in FIG. 19 (see below). Additional information can be accessed concerning FASB rulings on the accounting issues by clicking on the "new FASB rulings" phrase 84 shown in FIG. 10. The user proceeds to the next page by clicking on the phrase "Which method applies to my situation" 86 shown in FIG. 10.

FIG. 11 shows the next page which describes the methods required for this section and which allows the user to click into the page after that by clicking on the "Proceed to next page" phrase 90.

That next page is shown in FIG. 12. Tables 92 and 94 on that page invite responses to two sets of questions designed to obtain facts necessary to the determination of whether the proposed transaction constitutes a business combination and the determination of the acquiring entity tool.

The determination of business combination states and the determination of the acquiring entity tool is done through a decision tree prepared with the assistance of expert professional or consulting firms. As in the case of certain other modules, this is an interactive process. A person trained in the system first interviews a professional in the topic at issue, such as a lawyer or a tax accountant in the case of a topic involving legal or tax implications. This initial interview is designed to produce the broad outlines of a decision algorithm or "decision tree." It may be facilitated with the use of templates designed for producing decision algorithms or used in the past in similar decision algorithms. Once a preliminary decision algorithm is constructed, it can be refined and detailed by further interviews with the professional. After it is tentatively completed, it can be tested with the use of real or hypothetical data with respect to which the correct decision outcome is already known in order to determine whether there are discrepancies in the result or bugs in the processing. These can then be corrected, the algorithm retested, and the testing and correction procedure repeated until the system proves satisfactory. The algorithm is ultimately translated into computer code using a suitable computer language, and loaded into the system.

The algorithms used for processing and displaying data are conveniently categorized into several groups. There is computational logic which serves to process input data, versus presentation logic which serves to determine the screens, pages, sections, modules and submodules to be displayed. Within the category of computational logic are arithmetic logic and operations logic. Arithmetic logic is used to mathematically operate on input data that is in numeric form, typically to derive output data or intermediate data that also is in numeric form. The arithmetic logic is thus mathematical in nature. A simple example of arithmetic logic is an algorithm that computes profits by subtracting expenses and depreciation from revenue. Operations logic is used to operate on input data that is in non-numeric form, typically to derive output data or intermediate data that also is in non-numeric form. An example of operations logic is an algorithm that determines whether long-term capital gains treatment is available under the tax laws in connection with a transaction based upon input describing the nature of an asset that is the subject of the transaction.

The presentation logic in the system includes navigational logic and display logic. Navigational logic is used to determine which screens are displayed to a user based on the results of the computational logic. For example; if the computational logic determines that long-term capital gains treatment is available under the tax laws for a particular transaction, then the navigational logic may present screens associated with that determination rather than screens associated with alternative determinations such as a determination that only short-term capital gains treatment is available. The display logic determines the particular presentation of the screens identified by the navigational logic, i.e., the formatting issues.

Continuing with reference to the figures, if the system determination is that the proposed transaction is indeed a business combination, then clicking on the "Proceed to next page" phrase 98 accesses the page shown in FIG. 13 to determine whether the pooling method of accounting is available for the transaction. It can be seen that this page checks input data in three categories through the presentation of three tables of questions 102, 104 and 106.

If the system determination is that pooling is available, then clicking on the "Proceed to next page" phrase 108 will access the page shown in FIG. 14. The user can then assess the impact of the proposed acquisition or the company financial statements under a pooling accounting system, by inputting the answers to the questions presented on table 110.

Clicking on the "Proceed to next page" phrase 112 brings up the page shown in FIG. 15. The table 113 in this page shows pro form a financial statements under pooled accounting. Some of the data in this page will be the result of system calculations, while some will be simply the data input by the user in response to specific questions in the preceding pages, such as cash, net operating loss and the like. The pooling section is thus complete, and clicking on the "Back to main module" phrase 114 redirects the user to the page shown in FIGS. 8A, 8B and 8C.

The system may determine from the input data elicited up to and through the page shown in FIG. 13 that pooling is not available. In that event, upon clicking on the "Proceed to next page" phrase 108 in the page of FIG. 13, the user is directed to the page of FIG. 16 for application of the Purchase Method of Accounting. Acquiring companies typically desire the pooling method of accounting over the purchase method, and so this page leads with a list of the reasons 115 that pooling was determined to be unavailable in order of importance. This list allows the user to consider modifying the structure of the transaction, to address those reasons and inputting the data corresponding to the modified transaction in an effort to obtain pooling treatment. These reasons listed are unique to the data input and are derived from the algorithms created at the outset from the decision tree iterations.

The next paragraph explains that this page assists the user in analyzing the impact of the proposed transaction on the company's financial statement using the purchase method of accounting. The following table 116 requests input data in response to questions of concern to the purchase method accounting computations, and the user is then invited to access the next page.

The next page, shown in FIG. 17, shows on a table 118 the pro form a results of the proposed transaction or the financial statements of the acquiring company using the purchase method of accounting. Again, some of these numerical results are computed, while some are simply drawn from the input data. As in the case of the pooling method section, the user then returns to the non-module page shown in FIGS. 8A, 8B and 8C by checking on the "Back to main module" phrase 120.

FIG. 18 shows a page devoted to defining several terms used in the module for the convenience of the user. This page is accessed from the page shown in FIG. 1, the Module Home page. FIG. 19 shows a page devoted to an example of the pooling method versus the purchase method of accounting in a hypothetical acquisition, so that the user can see how the two methods compare correctly, which also is accessed from the Module Home page of FIG. 1. FIG. 20 shows an outline of appendices to this module describing certain additional ramifications of the outcome. This page is accessed through the page hierarchy of FIG. 9.

It can be appreciated from the above examples that the system is based upon the combination of several advantageous properties. It presents pure information to assist in educating the user about the matter under consideration. Moreover, this information is accessible at the points in the process where it is applicable. Thus, the system does not attempt to create an expert out of a non-expert all at once and at the outset. Rather, the system provides useful and practical information at the time the user needs to use it.

Further, the system is organized in such a way that the user can use only so much of it as desired. If the user is initially interested in a preliminary recommendation or set of recommendations, rather than a further refinement, that alone is available. If a user is interested in quickly seeing the effect or the recommendations of changing the input data, that is available. If a user wishes to use one module but not another, that is generally available.

The hierarchy of modules, submodules, sections, subsections, and pages, and their interrelationship with the data elements and formulae is important. By making the completion of certain pages, or the entering of certain data, or the making of certain determinations by the system, preconditions to entering subsequent pages, the system ensures that the use of the system is tailored to the particular circumstances of the user.

We claim:

1. A method for assisting a user in a process of decision-making or analysis involving a topic, with the aid of a computer and a display screen in association with the computer and an application on the computer, comprising using the display, computer, and application for;
   a. displaying a screen set soliciting a set of input data, and inputting said set of input data, wherein at least some of the data is characterized with a value representing a degree of certainty regarding the data;
   b. optionally processing the input data through at least a portion of an algorithm to determine further content to display, input data to solicit, or modification of previous input data;
   c. displaying a screen or screen set showing the current recommendation or analysis where the degree of certainty regarding the input data is reflected in the recommendation, calculations, or output;
   d. optionally providing information or links in step (c) to modify those inputs which are determined to have the highest importance and thus impact on the current recommendations;
   e. optionally providing information or links in step (c) to modify those inputs which are determined to have the greatest effect on the calculated certainty of the current recommendation or analysis;
   f. optionally providing information or links in step (c) to modify those inputs which are determined to have the greatest effect on the calculated certainty of a particular calculated result.

2. The method of claim 1, wherein the application comprises a web application.

3. The method of claim 1, wherein the application comprises a downloadable application.

4. The method of claim 1, wherein a screen set soliciting a set of input data comprises a plurality of pages, wherein the pages are grouped into a plurality of sections, wherein each section contains one or more pages.

5. The method of claim 4, wherein at least one section has a priority attribute used to determine the order of presentation to a user.

6. The method of claim 4, wherein at least one page has a priority attribute used to determine the order of presentation to a user.

7. The method of claim 4, wherein at least one section has a precondition attribute used to determine whether the section is presented to a user.

8. The method of claim 4, wherein at least one page has a precondition attribute used to determine whether the page is presented to a user.

9. The method of claim 1, wherein the value representing a degree of certainty regarding the data is assigned or calculated by the application.

10. The method of claim 1, wherein the algorithm includes computational logic for processing the input data and presentation logic for selecting the screen set and organizations for display.

11. The method of claim 10, wherein the computational logic includes arithmetic logic for mathematically operating on numerical input data to derive numerical processed data.

12. The method of claim 10, wherein the computational logic includes operations logic for determining conclusions based at least in part on non-numeric input data.

13. The method of claim 10, wherein the presentation logic includes navigational logic for establishing a set of screens having a determined organization scheme based on results determined by the computational logic using the input data.

14. The method of claim 13, wherein the presentation logic includes display logic for establishing a format for display of the established screen sets.

15. The method of claim 1, wherein the algorithm is used with a relational database.

16. The method of claim 1, wherein the value representing a degree of certainty regarding the data is input or calculated by a user.

17. A method for assisting a user in a process of decision-making or analysis involving a topic, with the aid of a computer and a display screen in association with the computer and an application on the computer, comprising using the display, computer, and application for:
   a. displaying a screen set having information concerning the topic;
   b. displaying a screen set soliciting a set of input data, and inputting said set of input data, wherein optionally some of the data is characterized with a value representing a degree of certainty regarding the data;
   c. determining and displaying a current recommendation generated iteratively by processing the input data through at least a portion of the algorithm;
   d. providing the option to accept the current recommendation as a final recommendation and ending the processing;
   e. displaying a screen set soliciting additional input data and for modifying previous input data as desired when the current recommendation is not accepted as a final recommendation, the contents of said screen set being dependent on and determined by step (c), and inputting said additional input data or modified previous input data;
   f. repeating steps (c) and (d), and (e) as desired; and
   g. displaying a screen set showing the current recommendation or analysis;

h. optionally providing information or links in step (c) to modify those inputs which are determined to have the highest importance and thus impact on the current recommendations;
i. optionally providing information or links in step (c) to modify those-inputs which are determined to have the greatest effect on the calculated certainty of the current recommendation or analysis;
j. optionally providing information or links in step (c) to modify those inputs which are determined to have the greatest effect on the calculated certainty of a particular calculated result.

18. The method of claim 17, wherein the application comprises a web application.

19. The method of claim 17, wherein the application comprises a downloadable application.

20. The method of claim 17, wherein a screen set having information concerning the topic or a screen set soliciting a set of input data comprises a plurality of pages, wherein at least one page comprises a paragraphs with headings and optionally, one or more data elements for storing input or calculated data.

21. The method of claim 17, wherein the algorithm is used with a relational database.

* * * * *